Patented May 9, 1933

1,908,190

UNITED STATES PATENT OFFICE

KARL SCHÖLLKOPF, OF DUSSELDORF-OBERKASSEL, GERMANY, ASSIGNOR TO RHEINISCHE KAMPFER-FABRIK GESELLSCHAFT MIT BESCHRANKTER HAFTUNG, OF DUSSELDORF-OBERKASSEL, GERMANY, A GERMAN COMPANY

PROCESS FOR THE CATALYTIC ALKYLATION OF ORGANIC COMPOUNDS

No Drawing. Original application filed August 22, 1929, Serial No. 387,819, and in Germany September 17, 1928. Divided and this application filed January 29, 1931, Serial No. 512,221.

This invention relates to a process for the catalytic alkylation of organic compounds. This process of alkylation is to be understood to include the introduction of alkyl, cycloalkyl and aralkyl groups into the organic compounds.

In my copending application Serial Number 387,819 I have described a process for the catalytic alkylation of organic compounds which consists in attaching unsaturated hydrocarbons to the compounds to be alkylated with the aid of certain new catalysts under the influence of heat. As catalysts are employed bleaching earths, activated by treatment with acids as well as clays, kaolins and similar silicates, activated in like manner. These substances mainly consist of hydrosilicates of aluminium, magnesium and iron and free hydrated silicic acid and are referred to in the following as "activated hydrosilicates". By further treating these activated hydrosilicates with acids, such as hydrochloric acid or sulphuric acid, the basic constituents, such as aluminium oxide, magnesium oxide and iron oxide, are almost completely dissolved out. The resulting hydrated silicic acids are also well adapted as catalysts for effecting alkylation.

It has now been found that, in place of the unsaturated hydrocarbons, the corresponding alcohols may be heated with the organic compounds to be alkylated in the presence of the above mentioned new catalysts, as the latter also have a strong dehydrating action. Thus, for example, in place of ethylene, ethyl alcohol and in place of cyclohexene, cyclohexanol may be employed. According to the present process methyl alcohol may be employed for methylation. The alkylation in these cases takes place with a simultaneous elimination of water.

In this new process all the organic compounds can be alkylated in which a hydrogen atom can be directly substituted by an alkyl, cycloalkyl or aralkyl group.

The alkylation in the nucleus of cyclic compounds, such as benzene, naphthalene or their substitution products, such as halogen-, nitro- and other derivatives, is readily effected by heating the alcohols, for example ethyl alcohol, propyl alcohol, cyclohexanol, phenyl ethyl alcohol together with the cyclic compounds in the presence of the aforesaid new contact substances with the formation of products alkylated at one or more nuclear carbon atoms.

As well as alkylation in the nucleus it is also possible to effect alkylation at the oxygen atom with the aid of the new contacts. The alkylation of phenols or their derivatives, such as the halogen derivatives of phenols, by heating the phenols with the alcohols in the presence of the new contacts, takes place particularly readily, the corresponding phenol ethers being first formed. Owing to migration of the alkyl group from the oxygen atom into the nucleus, isomerisation takes place, whereby phenols alkylated in the nucleus are obtained. The propylation of m-cresol by heating the latter with the propyl alcohols in the presence of catalysts already forms the subject matter of the copending application Ser. No. 506,747 (divisional from the application Ser. No. 289,612). According to the latter specification besides various other catalysts and contact substances the activated hydrosilicates employed according to the present invention are employed for effecting propylation. The propylation of cresols is therefore to be excluded from the present process.

The aforesaid new contact substances further effect the alkylation of carboxylic acids with the formation of esters. For example by heating isopropyl alcohol with benzoic acid in the presence of the said contact substances the isopropyl ester of benzoic acid is obtained.

The aliphatic and aromatic alcohols can be readily converted into the corresponding ethers by heating them with the activated hydrosilicates or with the hydrated silicic acids obtained therefrom; thus for example di-ethyl ether is readily obtained from ethyl alcohol.

It is also possible to effect alkylation at the nitrogen atom as well as alkylation at the carbon and oxygen atoms with the aid of the activated hydrosilicates and the hydrated silicic acids obtained therefrom. Thus, with the aid of these contact substances the alkylation of amines, for example aniline or naphthylamine to the corresponding products alkylated at the nitrogen atom is readily effected by heating the amines with the alcohols in the presence of the said contact substances.

The following examples serve to show how the catalytic alkylation by heating the compounds to be alkylated with the alcohols may be effected by means of activated hydrosilicates and hydrated silicic acids obtained therefrom, it being understood, however, that the methods of application of these new contact substances are not limited to the described mode of action.

*Example 1.*—2 parts of cyclohexanol and 4 parts of benzene are heated with 1 part of one of the commercial activated bleaching earths in an autoclave to about 200° C. for about 6 hours with stirring. After removing the bleaching earth the reaction mixture is fractionally distilled, and the excess of benzene and the resulting water of reaction first separated. The reaction products consist chiefly of cyclohexyl-benzene of boiling point 238° C. and in lesser quantity of a mixture of higher boiling isomeric dicyclohexyl-benzenes.

*Example 2.*—2 parts of benzyl alcohol and 4 parts of benzene are heated in an autoclave to about 230° C. with 1 part of an activated hydrosilicate for about 6 hours with stirring. After separating the hydrosilicate the reaction mixture is fractionally distilled and the excess of benzene and the resulting water of reaction first separated. A fraction boiling at 260–270° C. is next separated, which crystallizes in the cold and consists of benzyl-benzene or diphenyl-methane. The latter is obtained pure with a melting point of 26–27° C. and a boiling point of 264° C., by recrystallization from petrol ether. The last fraction consists of a mixture of isomeric dibenzyl-benzenes, which when recrystallized from alcohol have a melting point of 80, 5° C. to 81, 5° C.

*Example 3.*—6 parts of phenol (carbolic acid) and 2 parts of methyl alcohol are heated for 10–15 hours to 220–230° C. with 2 parts of an activated hydrosilicate in an autoclave with stirring. After separating the hydrosilicate the unchanged phenol is separated from the anisol contained in the reaction mixture by means of dilute caustic soda solution. A good yield of anisol is obtained.

If anisol is heated for several hours with 20% of hydrosilicate in an autoclave at about 250° C. with stirring it is converted into a mixture of isomeric cresols.

*Example 4.*—Ethyl alcohol vapour is passed at 150–200° C. over a contact consisting of an activated bleaching earth. On condensing the issuing vapours an almost quantitative yield of di-ethyl-ether is obtained.

*Example 5.*—8 parts of aniline and 3 parts of methyl alcohol are heated for about 12 hours in an autoclave with stirring to about 230° C. with 3 parts of an activated hydrosilicate. After suitable cooling down the resulting water of reaction is distilled off from the autoclave, 3 parts of methyl alcohol are then again introduced and the mixture heated to 230° C. for a further 12 hours. Dimethyl aniline is obtained as the main product. Dimethyl aniline is also obtained by passing aniline with sufficient methyl alcohol over an activated hydrosilicate at about 230–300° C.

In place of the activated bleaching earths employed in Examples 1–5, kaolins which have been partially decomposed by heating to 100–120° C. for several hours with 25% sulphuric acid, may also be employed. Further the bleaching earths or kaolins and similar silicates may be converted by a fairly long treatment with strong hydrochloric acid or sulphuric acid at about 100–120° C. into the corresponding hydrated silicic acids and the latter employed as contacts after washing out the mineral acids and drying on the water bath.

What I claim is:—

1. A process for the catalytic alkylation of organic compounds, in which a hydrogen atom can be directly substituted by an alkyl group, said process consisting in causing alcohols to react with the aid of heat with the compounds to be alklyated with the elimination of water in the presence of hydrosilicates, activated by treatment with mineral acids, as catalysts.

2. A process for the catalytic alkylation of organic compounds, in which a hydrogen atom can be directly substituted by an alkyl group, said process consisting in causing alcohols to react with the aid of heat with the compounds to be alkylated with the elimination of water in the presence of bleaching earths, activated by treatment with mineral acids, as catalysts.

3. A process for the catalytic alkylation of organic compounds, in which a hydrogen atom can be directly substituted by an alkyl group, said process consisting in causing alcohols to react with the aid of heat with the compounds to be alkylated with the elimination of water in the presence of silicates such as clays or kaolins, activated by treatment with mineral acids, as catalysts.

4. A process for the catalytic alkylation of organic compounds, in which a hydrogen atom can be directly substituted by an alkyl group, said process consisting in causing alcohols to react with the aid of heat with the compounds to be alkylated with the elimination of water in the presence of hydrated silicic acids, obtained from hydrosilicates by treating the latter with mineral acids, as catalysts.

In testimony whereof I hereunto set my hand this 16th day of January 1931.

KARL SCHÖLLKOPF.